US006449736B1

United States Patent
Matt et al.

(10) Patent No.: US 6,449,736 B1
(45) Date of Patent: Sep. 10, 2002

(54) METHOD AND APPARATUS FOR PROVIDING CHAINED BREAKPOINTS IN A MICROPROCESSOR

(75) Inventors: David R. Matt, Missouri City, TX (US); Venkatesh Natarajan, Bangalore (IN); M. R. Karthikeyan, Bangalore (IN)

(73) Assignee: Texas Instruments Incorporated, Dallas, TX (US)

( * ) Notice: Subject to any disclaimer, the term of this patent is extended or adjusted under 35 U.S.C. 154(b) by 0 days.

(21) Appl. No.: 09/421,832

(22) Filed: Oct. 20, 1999

(51) Int. Cl.$^7$ ................................................. G06F 11/00
(52) U.S. Cl. ............................................. 714/35; 714/34
(58) Field of Search ............................... 719/27, 30, 34, 719/35

(56) References Cited

U.S. PATENT DOCUMENTS

| | | | | |
|---|---|---|---|---|
| 5,724,566 A | * | 3/1998 | Swoboda et al. | 712/205 |
| 5,745,723 A | | 4/1998 | Masahito et al. | |
| 5,838,692 A | * | 11/1998 | Tobin | 714/30 |
| 5,996,059 A | * | 11/1999 | Porten et al. | 712/200 |
| 6,106,572 A | * | 8/2000 | Halpern | 714/35 |
| 6,134,652 A | * | 10/2000 | Warren | 712/216 |
| 6,145,123 A | * | 11/2000 | Torrey et al. | 703/28 |

\* cited by examiner

*Primary Examiner*—Scott Baderman
*Assistant Examiner*—Bryce P. Bonzo
(74) *Attorney, Agent, or Firm*—Gerald E. Laws; W. James Brady, III; Frederick J. Telecky, Jr.

(57) ABSTRACT

A processor core is provided that is a programmable digital signal processor (DSP). The microprocessor is operable to execute a sequence of instructions obtained from an instruction bus and has program counter circuitry for providing a first instruction address to the instruction bus. An instruction buffer is operable to hold at least a first instruction of the sequence of instructions obtained from the instruction bus. Breakpoint event generation circuitry is connected to the instruction bus and is operable to detect a designated mark instruction and a designated chain instruction in the sequence of instructions. Tag circuitry is associated with the instruction buffer and is operable to hold a mark tag and a chain tag, and is further operable to be set in response to the breakpoint event circuitry. An instruction execution pipeline is connected to receive the sequence of instructions from the instruction buffer register along with respective mark tags and chain tags from the tag circuitry. The instruction execution pipeline has a point of no return instruction pipeline stage. Breakpoint state machine circuitry is connected to the point of no return instruction pipeline stage and is operable to monitor mark tags and chain tags received by the point of no return instruction pipeline stage. The breakpoint state machine is further operable to indicate a chained breakpoint event when a chain tag is received after a mark tag form the point of no return instruction pipeline stage.

8 Claims, 7 Drawing Sheets

| CLOCK | PREFETCH | FETCH | DECODE | READ | EXECUTE | STORE | PROGRAM COUNTER |
|---|---|---|---|---|---|---|---|
| 1 | $I_1$ | | | | | | 0006 |
| 2 | $I_2$ | $I_1$ | | | | | 0007 |
| 3 | $I_3$ | $I_2$ | $I_1$ | 500 | | | 0008 |
| 4 | $I_4$ | $I_3, I_2$ | | $I_1$ | | | 0009 |
| 5 | $I_4$ | $I_3, I_2$ | | | $I_1$ | | 0009 |
| 6a | $I_5$ | $I_4, I_3$ | $I_2$ | | | $I_1$ | 000A |
| 6b | $I_{sub1}$ | | | | | $I_1$ | SUBROUTINE ADDRESS |
| N | $I_2$ | 510 | 511 | | | | 0007 |
| N+1 | $I_3$ | $I_2$ | | | | | 0008 |
| N+2 | $I_4$ | $I_3$ | $I_2$ | | | | 0009 |
| N+3 | $I_5$ | $I_4$ | $I_3$ | $I_2$ | | | 000A |
| N+4 | $I_6$ | $I_5$ | $I_4$ | $I_3$ | $I_2$ | | 000B |

METHOD AND APPARATUS FOR PROVIDING CHAINED BREAKPOINTS IN A MICROPROCESSOR

FIELD OF THE INVENTION

The present invention relates to digital microprocessors, and more particularly to monitoring the operation and performance of digital microprocessors.

BACKGROUND OF THE INVENTION

Microprocessors are general purpose processors which require high instruction throughputs in order to execute software running thereon, and can have a wide range of processing requirements depending on the particular software applications involved. Prefetching of instructions into an internal buffer helps to maintain instruction throughput. A cache internal to the microprocessor may provide shorter instruction access times.

Known microprocessor debugging environments provide code profiling capability which allows the amount of cycles or instructions required to execute a specified routine or piece of code to be determined. Breakpoint monitoring is a known technique in which instruction code execution is interrupted when a preselected instruction is executed or when data is read or written from/to selected addresses.

Many different types of processors are known, of which microprocessors are but one example. For example, Digital Signal Processors (DSPs) are widely used, in particular for specific applications, such as mobile processing applications. DSPs are typically configured to optimize the performance of the applications concerned and to achieve this they employ more specialized execution units and instruction sets. Particularly in, but not exclusively, applications such as disk controllers for portable computers and mobile telecommunications, it is desirable to provide ever increasing DSP performance while keeping power consumption as low as possible.

SUMMARY OF THE INVENTION

A method and apparatus has now been discovered for providing chained breakpoint operation in a microprocessor with independent, or decoupled, fetch units. Particular and preferred aspects of the invention are set out in the accompanying independent and dependent claims.

In accordance with a first aspect of the invention, there is provided a microprocessor that is a programmable digital signal processor (DSP), offering both high code density and easy programming. Architecture and instruction set are optimized for low power consumption and high efficiency execution of DSP algorithms, such as for wireless telephones, as well as pure control tasks. The microprocessor is operable to execute a sequence of instructions obtained from an instruction bus and has program counter circuitry for providing a first instruction address to the instruction bus. An instruction buffer is operable to hold at least a first instruction of the sequence of instructions obtained from the instruction bus. Breakpoint event generation circuitry is connected to the instruction bus and is operable to detect a designated mark instruction and a designated chain instruction in the sequence of instructions. Tag circuitry is associated with the instruction buffer and is operable to hold a mark tag and a chain tag, and is further operable to be set in response to the breakpoint event circuitry. An instruction execution pipeline is connected to receive the sequence of instructions from the instruction buffer along with respective mark tags and chain tags from the tag circuitry. The instruction execution pipeline has a point of no return instruction pipeline stage. Breakpoint state machine circuitry is connected to the point of no return instruction pipeline stage and is operable to monitor mark tags and chain tags received by the point of no return instruction pipeline stage. The breakpoint state machine is further operable to indicate a chained breakpoint event when a chain tag is received after a mark tag from the point of no return instruction pipeline stage.

In accordance with another aspect of the present invention, a method of operating a digital system is provided. A microprocessor is operable to execute a sequence of instructions. A mark event or a chain event is generated when instructions in the sequence of instructions are prefetched into an instruction buffer and stored as tags in the instruction buffer with an associated instruction. Each instruction in the sequence of instructions is transferred from the instruction buffer to an instruction execution pipeline connected to receive the sequence of instructions from the instruction buffer register along with respective mark tags and chain tags, wherein the instruction execution pipeline has a point of no return instruction pipeline stage. The mark tags and chain tags received by the point of no return instruction pipeline stage are monitored and a chained breakpoint event is indicated when a chain tag is received after a mark tag.

BRIEF DESCRIPTION OF THE DRAWINGS

Particular embodiments in accordance with the invention will now be described, by way of example only, and with reference to the accompanying drawings in which like reference signs are used to denote like parts and in which the Figures relate to the processor of FIG. 1, unless otherwise stated, and in which.

DESCRIPTION OF PARTICULAR EMBODIMENTS

Although the invention finds particular application to Digital Signal Processors (DSPs), implemented, for example, in an Application Specific Integrated Circuit (ASIC), it also finds application to other forms of processors.

Figure 1:
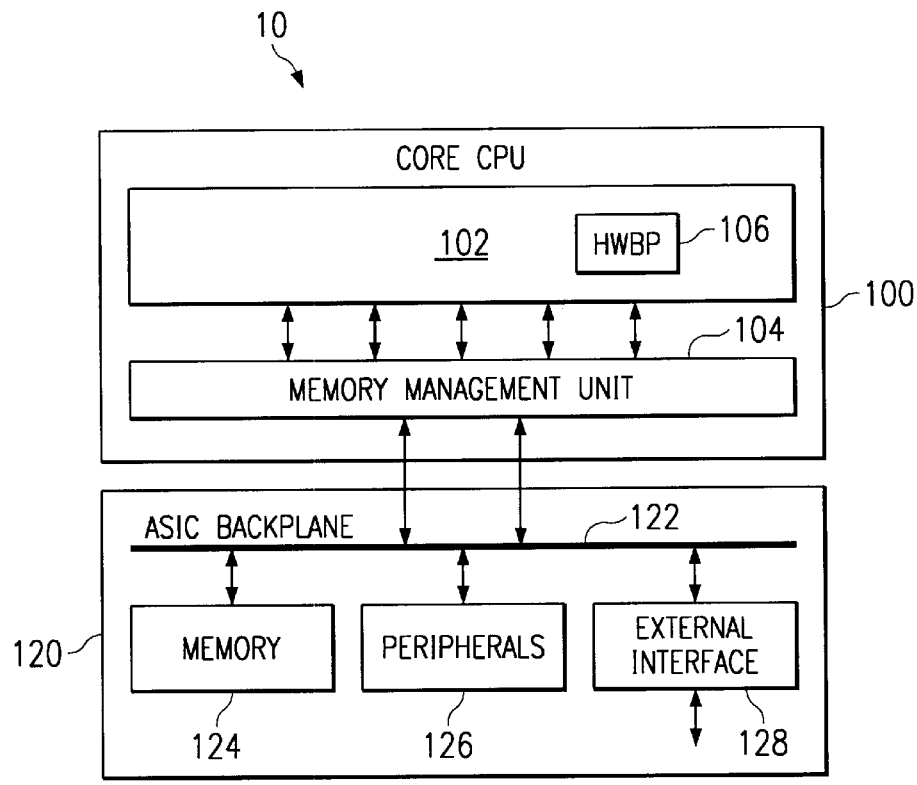
FIG. 1 is a schematic block diagram of a digital system which includes a microprocessor in accordance with an embodiment of the invention.

The basic architecture of an example of a processor according to the invention will now be described. Processor 100 of FIG. 1 is a programmable fixed point DSP core offering both high code density and easy programming. Architecture and instruction set are optimized for low power consumption and high efficiency execution of DSP algorithms as well as pure control tasks, such as for wireless telephones, for example. Processor 100 includes emulation and code debugging facilities.

FIG. 1 is a schematic overview of a digital system 10 in accordance with an embodiment of the present invention. The digital system includes a processor 100 and a processor backplane 120. In a particular example of the invention, the digital system is a Digital Signal Processor System 10 implemented in an Application Specific Integrated Circuit (ASIC). In the interest of clarity, FIG. 1 only shows those portions of microprocessor 100 that are relevant to an understanding of an embodiment of the present invention. Details of general construction for DSPs are well known, and may be found readily elsewhere. For example, U.S. Pat. No. 5,072,418 issued to Frederick Boutaud, et al, describes a DSP in detail and is incorporated herein by reference. U.S. Pat. No. 5,329,471 issued to Gary Swoboda, et al, describes in detail how to test and emulate a DSP and is incorporated herein by reference. Details of portions of microprocessor 100 relevant to an embodiment of the present invention are explained in sufficient detail herein below, so as to enable one of ordinary skill in the microprocessor art to make and use the invention.

Several example systems which can benefit from aspects of the present invention are described in U.S. Pat. No. 5,072,418, which was incorporated by reference herein, particularly with reference to FIGS. 2–18 of U.S. Pat. No. 5,072,418. A microprocessor incorporating an aspect of the present invention to improve performance or reduce cost can be used to further improve the systems described in U.S. Pat. No. 5,072,418. Such systems include, but are not limited to, industrial process controls, automotive vehicle systems, motor controls, robotic control systems, satellite telecommunication systems, echo canceling systems, modems, video imaging systems, speech recognition systems, vocoder-modem systems with encryption, and such.

As shown in FIG. 1, processor 100 forms a central processing unit (CPU) with a processor core 102 and a memory interface unit 104 for interfacing the processor core 102 with memory units external to the processor core 102. Hardware breakpoint point circuitry 106 monitors instruction and data address buses and sends a trigger signal to emulation circuitry when a pre-selected address or sequence of addresses is detected.

Processor backplane 120 comprises a backplane bus 122, to which the memory management unit 104 of the processor is connected. Also connected to the backplane bus 122 is an instruction memory 124, peripheral devices 126 and an external interface 128.

It will be appreciated that in other examples, the invention could be implemented using different configurations and/or different technologies. For example, processor 100 could form a first integrated circuit, with the processor backplane 120 being separate therefrom. Processor 100 could, for example be a DSP separate from and mounted on a backplane 120 supporting a backplane bus 122, peripheral and external interfaces. The processor 100 could, for example, be a microprocessor rather than a DSP and could be implemented in technologies other than ASIC technology. The processor or a system including the processor could be implemented in one or more integrated circuits.

Figure 2:
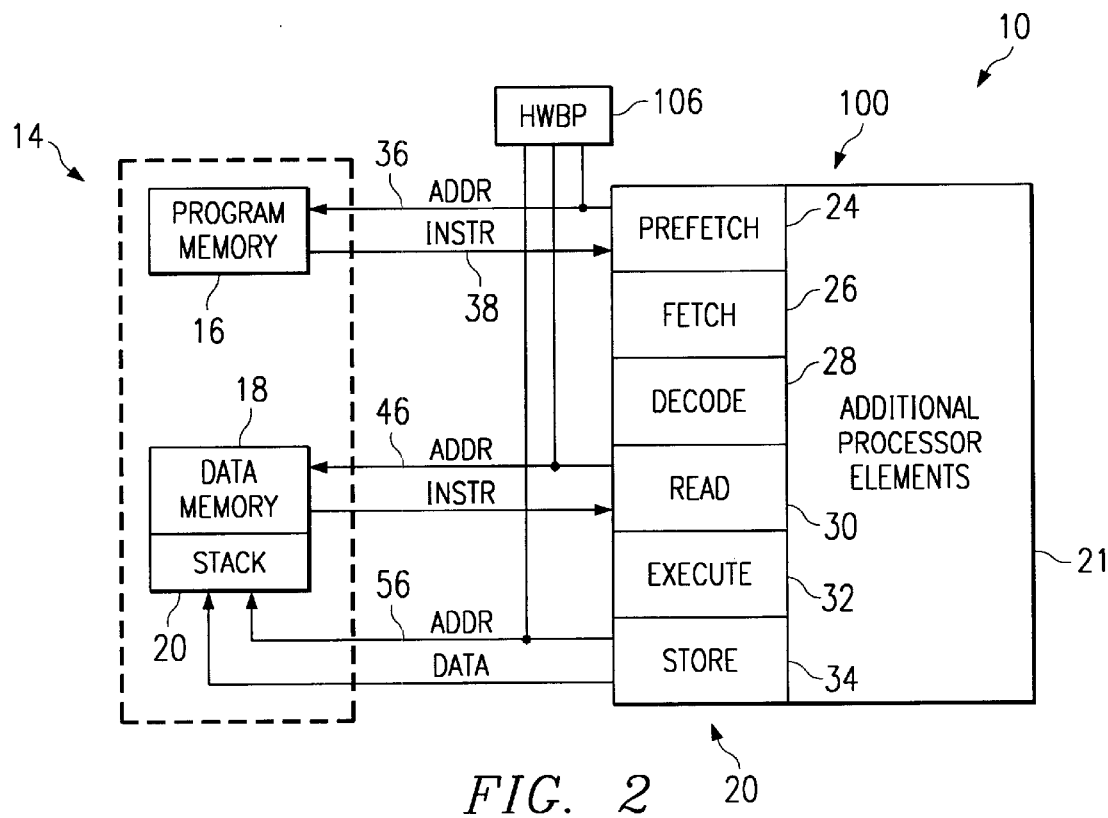
FIG. 2 is a more detailed block diagram of digital system of FIG. 1 according to the teachings of the present invention.

FIG. 2 is a more detailed block diagram of digital system 10 according to the teachings of the present invention. Computer system 10 includes a processor 100 and a memory system 14. Processor 100 is operable to access memory system 14. Memory system 14 may include both a program memory 16 and a data memory 18.

Processor 100 includes a pipeline 20. Pipeline 20 includes a prefetch stage 24, a fetch stage 26, a decode stage 28, a read stage 30, an execute stage 32, and a store stage 34. Processor 100 may also include additional processing elements 21.

Prefetch stage 24 obtains an instruction from a memory location in program memory 16. Prefetch stage 24 issues a memory address to program memory 16, and an instruction stored in the location in program memory 16 that corresponds to that address is provided to prefetch stage 24. An address is provided by prefetch stage 24 to program memory 16 on instruction address bus 36. An instruction is returned to prefetch unit 24 from program memory 16 on instruction bus 38. Prefetch stage 24 includes a program counter 58 that generates an address corresponding to an instruction stored in program memory 16. Prefetch stage 24 may be replaced with more than one pipeline stage. For example, prefetch stage 24 may be replaced with a separate stage that performs the function of computing an address of the memory location in program memory 16 from which to read an instruction and a separate stage that performs the function of reading the instruction from the specified address. However, as used hereinafter, "prefetch stage" refers to the stage in a pipeline that actually calculates an address from which an instruction is to be obtained.

Figures 4, 5:
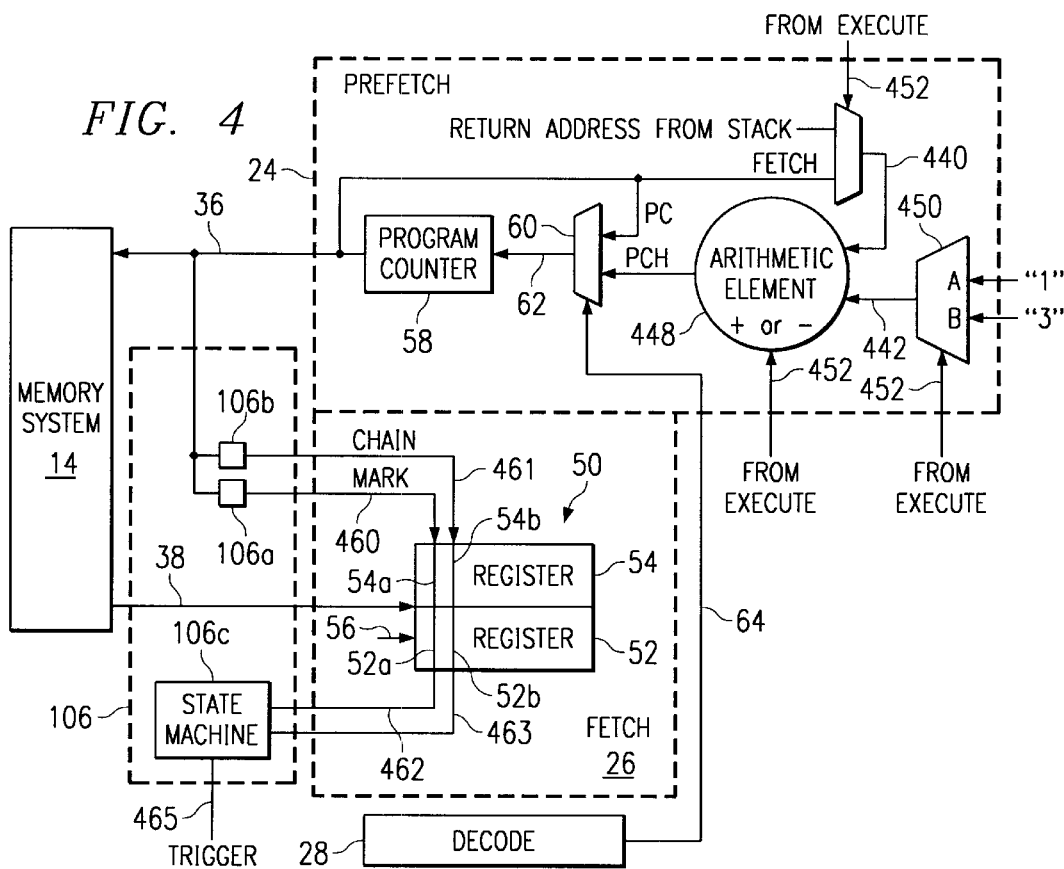
FIG. 4 is a block diagram of a portion of the instruction execution pipeline of FIG. 2.
FIG. 5 illustrates progression of instructions through the instruction pipeline of FIG. 2 in which a conditional branch instruction is fetched and executed resulting in flushing of the instruction buffer and several stages of the instruction execution pipeline.

Fetch stage 26 includes a limited instruction buffer 50 for buffering instructions fetched from program memory 16. Limited instruction buffer 50 is illustrated in FIG. 4. In this example, limited instruction buffer 50 includes a first register 52, and a second register 54.

Decode stage 28 decodes the instruction obtained from program memory 16. Read stage 30 reads from data memory 18 any data necessary for execution of the instruction decoded by decode stage 28. Decode stage 28 and Read stage 30 may each be replaced with more than one stage. For example, Decode stage 28 may have a first stage that performs a gross decode to determine a class of instructions, for example, and a second stage that does a fine decode of the various instruction fields, for example. Likewise, read stage 30 may be replaced by a separate stage that performs a computation necessary to determine from which location in data memory 18 data will be read, and a separate stage that performs the function of reading such data. Execute stage 32 performs the function of executing the instruction decoded by decode stage 28. Although execute stage 32 may be divided into a plurality of stages, as used hereinafter, "execute stage" refers to a stage in a pipeline that performs at least the function of determining if a condition associated with a conditional call is met. Store stage 34 performs the function of writing any data that may be required to be written as a result of the execution of instruction 38.

Store stage 34 performs the function of writing any data that may be required to be written after execution of instruction, such as a result.

Breakpoint circuitry 106 monitors program address bus 36, data read address bus 46, and data write address bus 56. Breakpoint circuitry 106 causes instruction processing to halt for a simple breakpoint when an instruction at a selected address is executed, or for a chained breakpoint when two instructions at selected addresses are executed in a selected order. This is difficult to do in a processor with decoupled fetches, where instruction being fetched may not be executed, due to flushing of the instruction buffer which could happen any time a discontinuity is executed. Thus, no hard decision about a chained breakpoint can be made looking at fetch sequences an address bus 36. Several cases will now be described which must be handled by breakpoint circuitry 106.

For simplicity, only single stages for each of the categories discussed above will be shown in the following timing diagrams, however one skilled in the art can readily apply the teachings herein to instruction execution pipelines that have fewer or more stages.

Figure 3:
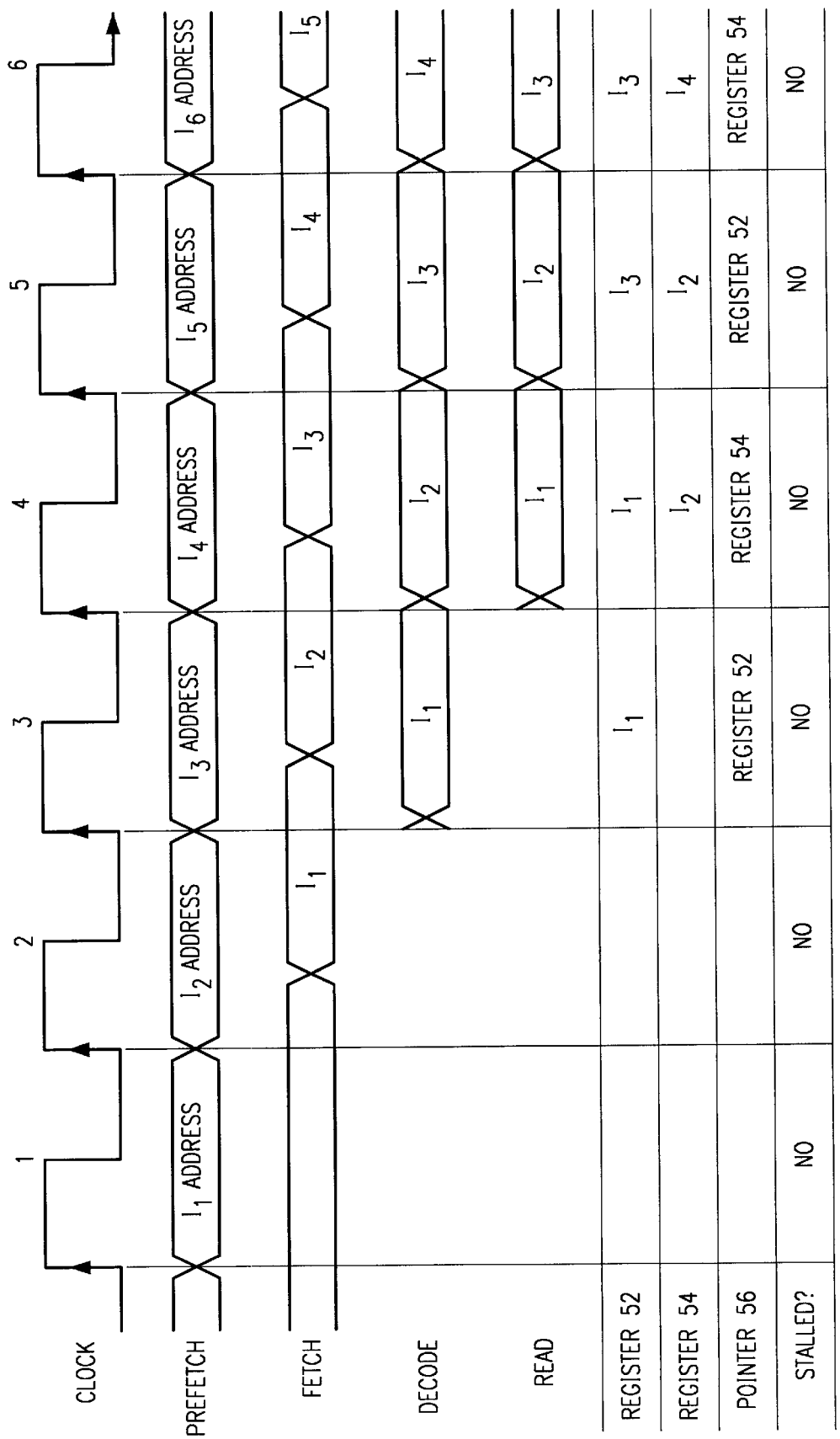
FIG. 3 is a timing diagram illustrating the location of instructions obtained from program memory in the instruction execution pipeline of FIG. 2.

FIG. 3 is a timing diagram illustrating the location of instructions obtained from program memory 16 with respect to the various stages of pipeline 20 for an example in which pipeline 20 does not stall. During normal processing, processor 100 continuously fetches instructions from locations in program memory 16 having sequential addresses for execution. If for some reason processor 100 stalls, processor 100 continues to fetch instructions from program memory 16. For example, processor 100 may stall while waiting to receive data from data memory 18; likewise, instruction decoding is stalled after a conditional branch until the condition is resolved. In such a case, limited instruction buffer 50 allows accumulation of two instructions while waiting for processing to resume. The operation of prefetch stage 24, fetch stage 26, and decode stage 28 in conjunction with limited instruction buffer 50 is described below with reference to FIG. 2 for an example in which no stall occurs.

During a first clock cycle, an address for a memory location corresponding to a first instruction $I_1$ is calculated. During a second clock cycle, an address for a second instruction $I_2$ is calculated, and fetching of instruction $I_1$ is initiated. During a third clock cycle, an address for a memory location corresponding to a third instruction $I_3$ is calculated, fetching of instruction $I_1$ is completed, fetching of $I_2$ is initiated, and decoding of instruction $I_1$ is initiated and completed because processor 100 is not stalled.

During a third clock cycle, register 52 of limited instruction buffer 50 stores instruction $I_1$. Limited instruction buffer 50 includes a pointer 56 that points to the register in limited instruction buffer 50 that stores the current instruction to be decoded. Instruction pointer 56 is depicted in FIG. 4 as pointing to register 52. During the third clock cycle, pointer 56 points to register 52. During a fourth clock cycle, an address for a fourth instruction $I_4$ is calculated, fetching of instruction $I_2$ is completed, fetching of instruction $I_3$ is initiated, and decoding of instruction $I_2$ is initiated and completed. During the fourth clock cycle, register 52 continues to store instruction $I_1$ because instruction $I_1$ has not been overwritten by another instruction, register 54 stores instruction $I_2$, and pointer 56 points to register 54.

During a fifth clock cycle, an address for a fifth instruction $I_5$ is calculated, fetching of instruction $I_3$ is completed, fetching of instruction $I_4$ is initiated, and decoding of instruction $I_3$ is initiated and completed. During the fifth clock cycle, instruction $I_3$ is stored in register 52 and pointer 56 of limited instruction buffer 50 points to register 52. During a sixth clock cycle, an address for a sixth instruction $I_6$ is calculated, fetching of instruction $I_4$ is completed, fetching of instruction $I_5$ is initiated, decoding of instruction $I_4$ is initiated and completed, and any data associated with instruction $I_3$ is read. During the sixth clock cycle, instruction $I_4$ is stored in register 54 and pointer 56 of limited instruction buffer 50 points to register 54.

In the above-described sequence of obtaining and processing instructions, limited instruction buffer 50 stores an instruction in one of its two registers 52, 54 as the instruction is being decoded. Because processor 100 does not stall in the above-described sequence, limited instruction buffer 50 is sufficient to allow continued fetching of additional sequential instructions without reissuing any fetches.

FIG. 4 is a block diagram of a portion of computer system 10. Multiplexer 60 receives a previous count PC of program counter 58 and a modified previous count PCH input signals. Multiplexer 60 produces an output signal 62 that provides an updated count for program counter 58. Multiplexer 60 is controlled by a selection signal 64 received from decode stage 28. When decode stage 28 is stalled, due to stalling of decode stage 28 itself or to stalling of a stage in pipeline 20 downstream of decode stage 28, selection signal 64 selects the previous value of program counter 58 and when decode stage 28 is not stalled, output signal 62 selects the modified previous count PCH of program counter 58 which is incremented by one. Output signal 62 is then provided to program counter 58. In this manner, when decode stage 28 is stalled, the most recent instruction for which an address has been calculated by prefetch stage 24 will be continually fetched until decode stage 28 is no longer stalled.

Thus, during stalls, if breakpoint circuitry 106 detects the selected breakpoint address(es) on address bus 36, during or just prior to a stall, a breakpoint interrupt must be delayed until after the stall is resolved so that instructions prior to the detected instruction reach the instruction execution pipeline.

FIG. 5 illustrates progression of instructions through pipeline 22 for an example of the operation of processor 100 in which a conditional branch instruction is fetched and executed resulting in flushing of the instruction buffer and several stages of the instruction execution pipeline. At a first clock cycle, a conditional branch instruction $I_1$ is fetched by prefetch stage 24. Instruction $I_1$ is obtained from a memory location having an address designated by program counter 58. In this example, instruction $I_1$ is obtained from memory location 0006. At a next clock cycle, clock cycle 2, instruction $I_1$ advances to fetch stage 26 and a second instruction $I_2$ is fetched by prefetch stage 24 from program memory 16. Program counter 58 provides the location from which to fetch the next instruction $I_2$. In this example, program counter 58 is incremented by one for each sequential fetch. Therefore during clock cycle 2, the program counter has a count of 0007. During a next clock cycle, instruction $I_1$ advances to decode stage 28, instruction $I_2$ advances to fetch stage 26, and a third instruction $I_3$ is fetched from a memory location in program memory 16 having an address of 0008. Since instruction $I_1$ is a conditional branch instruction, progress of following instructions is stalled until the branch condition is resolved.

During a fourth clock cycle, instruction $I_1$ advances to read stage 30, and instructions $I_2$ and $I_3$ stall. Instruction $I_4$ is stored in the instruction buffer. During a fifth clock cycle, instruction $I_1$ advances to execute stage 32, while instruction $I_2$, $I_3$ and $I_4$ remain stalled. Pipeline bubbles 500 are propagated in the pipeline.

In the case in which instruction $I_1$ is a conditional call instruction, during a sixth clock cycle two possible alternatives exist. In the first case, denoted by clock cycle 6a, execution of instruction $I_1$ determines that the condition associated with the conditional call instruction is not met. In such a case, instruction $I_1$ advances to store stage 34, instruction $I_2$ advances to decode stage 28, instruction $I_3$ advances to fetch stage 26, and a fifth instruction $I_5$ is fetched from a location in program memory 16 having an address of 000A.

Alternatively, as denoted by clock cycle 6b, if the condition associated with conditional call instruction $I_1$ is met, instruction $I_1$ advances to store stage 34 and instructions $I_2$ and $I_3$ are discarded, as indicated at 510 and 511, as well as $I_4$. A next instruction is fetched from a location in program memory 16 corresponding to a subroutine address associated with the conditional call instruction $I_1$. Thus program counter 58 is adjusted to correspond to the subroutine address of the next instruction to be fetched that corresponds to the conditional call instruction.

Before adjusting the count of program counter 58, the count of the program counter 58, which in this example is 000Ah, is stored to stack 20 in data memory 18. The stored value of program counter 58 is a return address for use in resuming main processing upon return from executing instructions associated with the conditional call instruction.

Upon return from executing the instructions associated with the conditional call instruction, designated by clock cycle N, a fetch instruction is issued to obtain the instruction that immediately preceded the conditional call instruction $I_1$, which in this example is instruction $I_2$. Therefore, the count of program counter 58 is required to be adjusted to a value of 0007. However, the return address stored in stack 20 is 000A. The correct value for program counter at 0007 may be obtained by subtracting the number of stages between prefetch stage 24 and execute stage 32 from the return address stored in stack 20. In this example pipeline 22 includes three stages between prefetch stage 24 and execute stage 32: fetch stage 26, decode stage 28, and read stage 30. Thus the correct count for program counter 58 may be obtained by subtracting three from the value stored in stack 20 upon the meeting of the condition associated with instruction $I_1$. Subtracting the number of stages between prefetch stage 24 and execute stage 32 from the value stored in program counter 58 provides a correct return address for program counter 58 upon completion of executing instructions associated with a conditional call instruction without requiring any delayed program counters.

Referring again to FIG. 4, additional details of prefetch stage 24 will now be discussed. In order to provide a correct address for obtaining additional instructions after executing instructions associated with the conditional call instruction, an arithmetic unit or element 448 is provided. Arithmetic element 448 receives two input signals. A first input signal 440 is indicative of the count of program counter 58. A second input signal 442 is indicative of either the number of stages between execute stage 32 and prefetch stage 24 for a given processor, which in this example is 3, or an increment value of one. In addition, arithmetic element 448 receives a control signal 452 from execute stage 32. Control signal 452 selects whether arithmetic element 448 performs an addition or subtraction operation, as described in greater detail below. Upon returning to normal processing after executing instructions associated with a conditional call instruction, the number of stages between execute stage 32 and prefetch stage 24 is provided to arithmetic element 48. However, if a condition associated with a conditional call instruction is not met and a return is not made, a one is provided to arithmetic element 48.

In one embodiment, the determination of whether to provide the number of stages between execute stage 32 and prefetch stage 24 to arithmetic element 448 or a one to arithmetic element 448 is made by a multiplexer 450 in conjunction with control signal 452 received from execute stage 32. Control signal 452 selects the number of stages between execute stage 32 and prefetch stage 24 if a return is being made from executing instructions associated with a conditional call instruction and selects one if a return is not being made from a conditional call instruction. In addition, control signal 452 selects the subtraction operator for arithmetic element 448 if a return is being made from executing a conditional call instruction and the addition operator for arithmetic element 448 if a return is not being made from executing a conditional call instruction. In the present embodiment, arithmetic element 448 subtracts the value of signal 442 from signal 440, which represents the current count of program counter 58, to produce an adjusted return address for providing to program memory 16 in order to obtain the next instruction sequentially following the conditional call instruction. In this example, the next instruction sequentially following the conditional call instruction is instruction $I_2$. If a return is not made from executing a conditional call instruction, arithmetic element 448 adds one to the value of signal 40.

Thus, if breakpoint circuitry 106 detects the selected breakpoint address(es) on address bus 36, just after to a conditional branch, a breakpoint interrupt must be delayed until after the stall is resolved so that instructions prior to the detected instruction reach the instruction execution pipeline, if the branch is not taken. Furthermore, if the branch is taken and the discarded instructions include a breakpoint instruction, then the breakpoint interrupt must be prevented.

Referring still to FIG. 4, further details of breakpoint circuitry 106 will now be described. Event generator 106a is a comparator that is preloaded with the first address of a chained breakpoint instruction sequence. When event generator 106a detects the first address on address bus 36, it asserts a "mark" signal 460 that is stored in a MARK tag bit 52a or 54a associated with the register 52 or 54 that receives the instruction in instruction buffer 50. Likewise, event generator 106b is a comparator that is preloaded with the second address of a chained breakpoint instruction sequence. When event generator 106b detects the second address on address bus 36, it asserts a "chain" signal 461 that is stored in a CHAIN tag bit 52b or 54b associated with the register 52 or 54 that receives the instruction in instruction buffer 50. Event generators 106a and 106b do not require state machine operation. In this embodiment, each event generator is independent from the other, however another embodiment can implement the event generators in a different manner and still realize aspects of the present invention. One skilled in the art will realize that in other embodiments, instruction buffer 50 can be enlarged to have more than two instruction buffer registers with corresponding tag bits.

State machine 106c monitors the tag bits of instructions as they leave fetch stage 26 and enter decode stage 28 on tag signals 462 and 463 and identifies the sequence of MARK and CHAIN to correctly generate a break event by asserting a trigger signal 465. Thus, advantageously, if the instruction execution pipeline is stalled or if the instruction buffer is flushed, the trigger signal is not asserted until and only if both the mark instruction and the tag instruction enter the decode stage. As described above, the stall interlock signal prevents an instruction from entering decode stage 28 until a branch condition is resolved. Once an instruction is allowed to enter decode stage 28, it will be executed unless the processor is reset. Thus, decode stage 28 is referred to as a point of no return instruction pipeline stage, since any instruction that enters decode stage 28 is always completely executed. Trigger signal 465 is used to stop instruction execution by either interrupting processor 100 or by invoking an external test system, which will be described in more detail with respect to FIG. 9.

Figure 6:
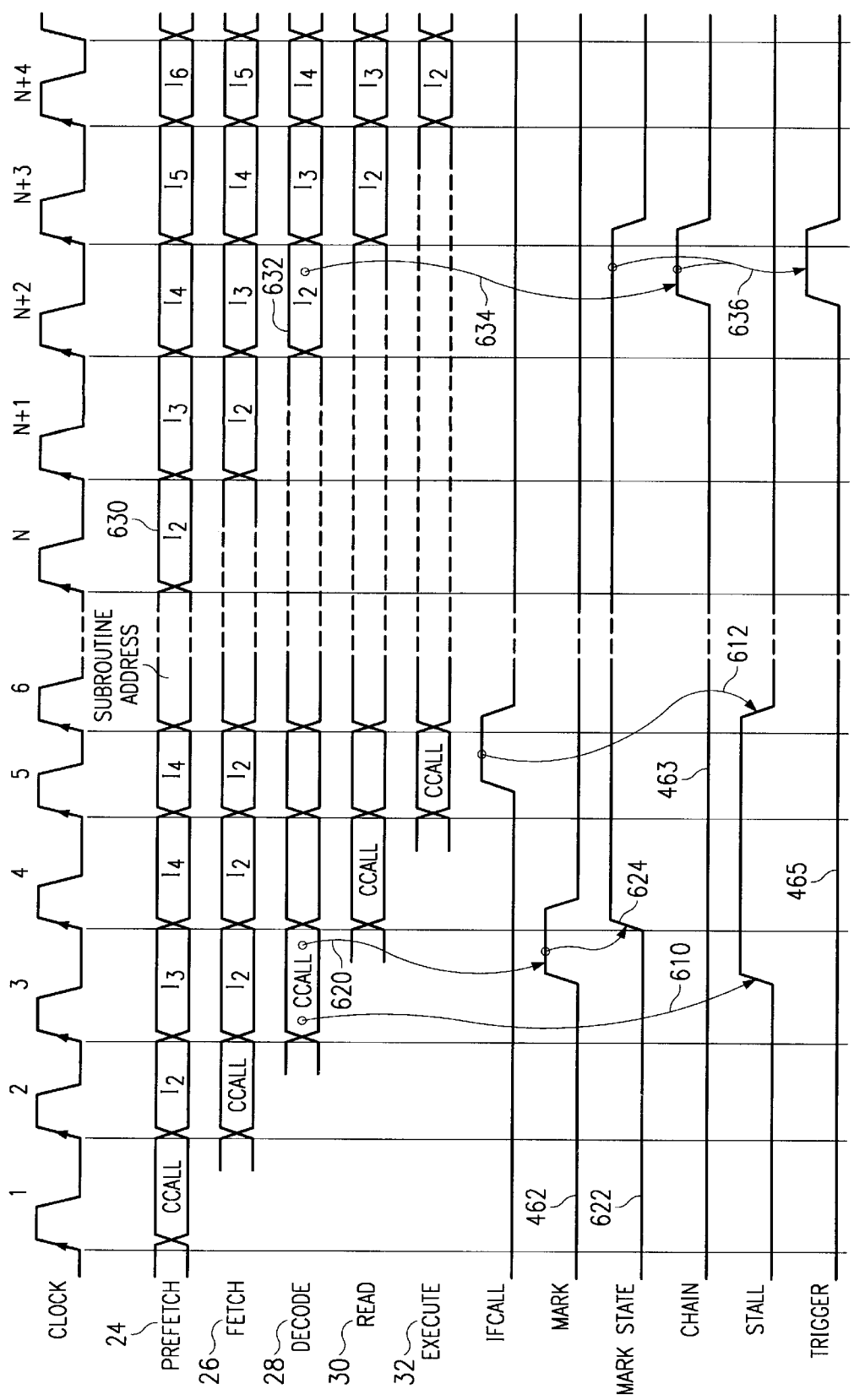
FIG. 6 is a timing diagram of the instruction sequence of FIG. 5 for a branch taken, showing the location of various instructions within the instruction execution pipeline of FIG. 2 during a breakpoint detection associated with a conditional branch instruction.

FIG. 6 is a timing diagram of the instruction sequence of FIG. 5 for a branch taken, showing the location of various instructions within a pipeline of processor 100 during a breakpoint detection associated with a conditional branch instruction. In this example, the conditional branch instruction CCALL is a conditional call instruction. However, a similar flow is followed for other types of conditional branch instructions and for branches caused by an interrupt from internal or external sources. Instruction CCALL has been designated as a first instruction, referred to herein as a mark instruction, for a chained branch sequence. However, a similar sequence would occur if another instruction executed prior to the CCALL instruction had been designated as a mark instruction. Instruction $I_2$ has been designated as a second instruction, referred to herein as a chain instruction, for the chained breakpoint sequence. However, one skilled in the art will recognize that a similar sequence will result if another instruction that is executed after $I_2$ is designated as the chain instruction.

As illustrated in FIG. 6, over a period of four clock cycles four instructions are sequentially fetched. These instructions include the conditional call instruction and three following instructions, "$I_2$," "$I_3$," and "$I_4$." The conditional call instruction advances through pipeline 20 and reaches execute stage 32 during the fifth clock cycle. A check is performed at execute stage 32 and a determination is made that a condition associated with the conditional call instruction is met. The meeting of the condition associated with the conditional call instruction is represented by a transition from a low value to a high value of a signal "ifcall," illustrated in FIG. 6. As discussed above, a stall condition is enacted upon decoding the CCALL instruction, as indicated by asserting a stall signal, shown at 610. Instructions following the CCALL instruction are prevented from entering the decode stage until the stall signal is deasserted upon determination of the condition, indicated at 612.

Breakpoint state machine 106c monitors mark signal 462 from decode stage 28. Since CCALL was designated as a mark instruction, mark event generator 106a detected the address of the CCALL instruction and set mark tag 52a/54a accordingly. Likewise, since instruction $I_2$ was designated as a chain instruction, chain event generator 106b detected the address of instruction $I_2$ and set chain tag 52b/54b accordingly. As indicated at 620, mark signal 462 is asserted when the CCALL instruction enters the decode stage and breakpoint state machine 106c steps to assert a mark state 622 in response, as indicated at 624. Breakpoint state machine 106c also monitors chain signal 463 from decode stage 28. Since instruction $I_2$ is stalled and does not enter decode stage 28, chain signal 463 is not asserted for state machine 106c. In this case, the branch condition is met, the pipeline is flushed such that instruction $I_2$ is not executed, and advantageously trigger signal 465 is not asserted.

Upon determining that the condition associated with the conditional call instruction is met, the current count of program counter 58 is stored as a return address, and program counter 58 is adjusted to hold a value of a subroutine address corresponding to the first address location storing instructions associated with the conditional call. An example location for storing the return address is stack 20. After completing execution of all instructions associated with a subroutine called by the conditional call instruction, a return instruction (not explicitly shown) is received by execute stage 32. Upon reception of a return instruction, program counter 58 is set to the value held by the return address and is adjusted by arithmetic element 448 to have a value corresponding to the return address minus the number of stages between execute stage 32 and prefetch stage 24. Thus upon return from the processing of the subroutine, the next instruction, $I_2$, is fetched, as indicated at 630. Again, since instruction $I_2$ was designated as a chain instruction, chain event generator 106b detects the address of instruction $I_2$ and sets chain tag 52b/54b accordingly. This time, instruction $I_2$ enters the decode stage at 632. Chain signal 463 is asserted in response, as indicated at 634. In response to the assertion of chain signal 463, breakpoint state machine 106c asserts trigger signal 465 as indicated at 636 because mark state 622 is still asserted. A breakpoint interrupt occurs in response to trigger signal 465.

Figure 7:
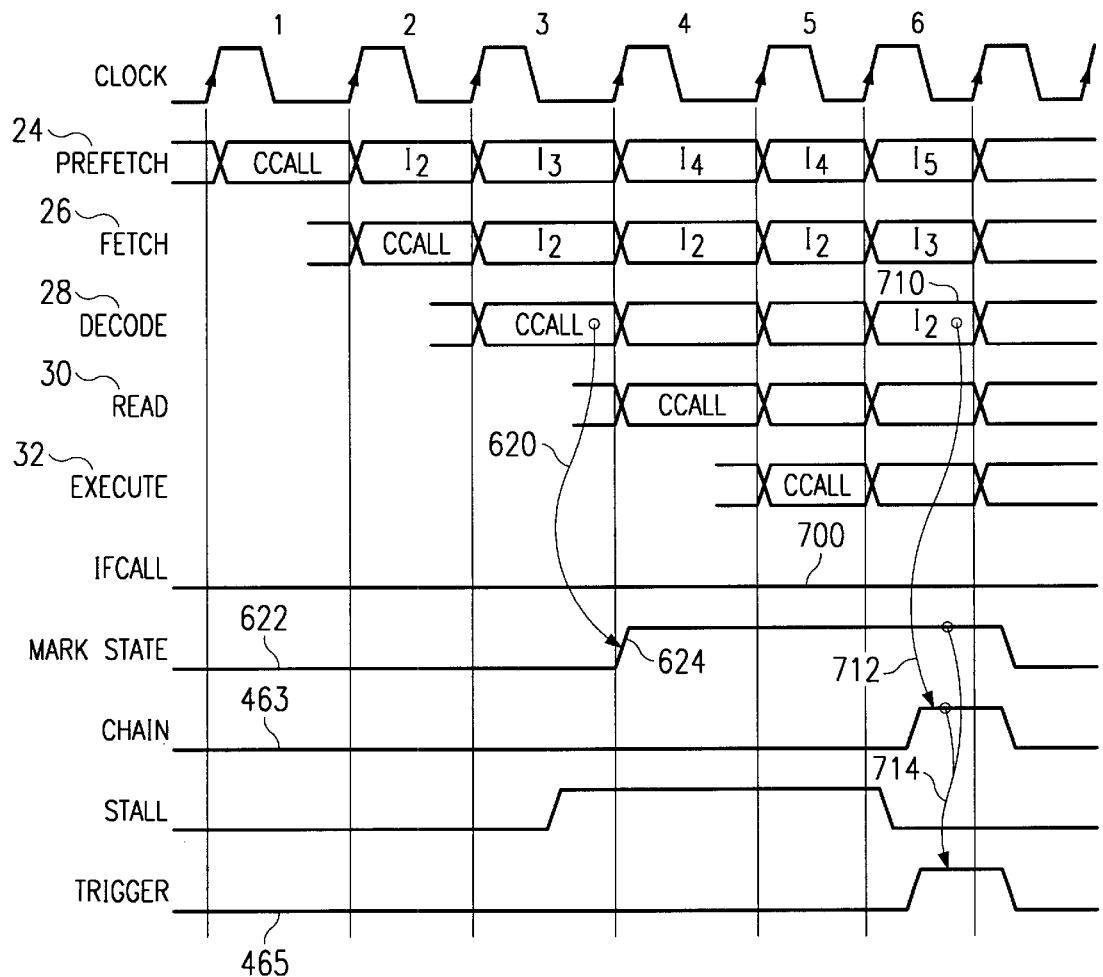
FIG. 7 is a timing diagram of the instruction sequence of FIG. 5 for a branch not taken.

FIG. 7 is a timing diagram of the instruction sequence of FIG. 5 for a branch not taken. Mark state 622 is asserted by instruction CCALL, as in FIG. 6. Instruction $I_2$ is stalled as before, but in this case the branch condition is not met, as indicated by the IFCALL signal at 700. Instruction $I_2$ enters the decode stage at 710 and chain signal 463 is asserted in response at 712. In response to the assertion of chain signal 463, breakpoint state machine 106c asserts trigger signal 465 as indicated at 714 because mark state 622 is still asserted. A breakpoint interrupt occurs in response to trigger signal 465.

Advantageously, as illustrated in FIGS. 6 and 7, a chained breakpoint is detected and a breakpoint interrupt occurs only when the chain instruction is executed, even if it was prefetched and flushed without being executed.

Figure 8:
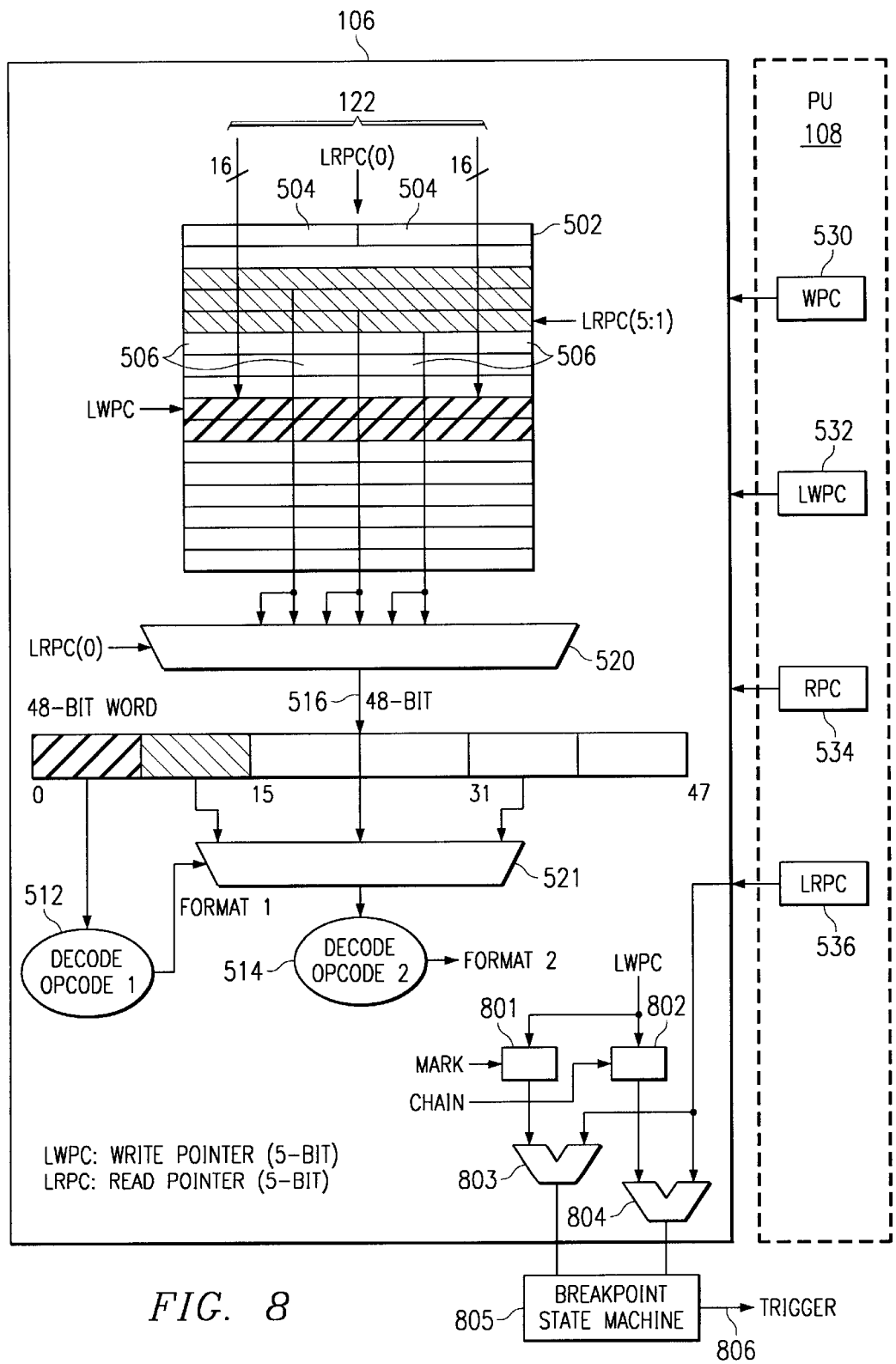
FIG. 8 is a block diagram illustrating another embodiment of an instruction buffer with tag circuitry, according to an aspect of the present invention.

Referring now to FIG. 8, there is illustrated an instruction buffer unit 106 in accordance with another embodiment, comprising a 32 word instruction buffer queue (IBQ) 502. The IBQ 502 comprises 32×16 bit registers 504, logically divided into 8 bit bytes 506. Instructions arrive at the IBQ 502 via the 32-bit program bus (PB) 122. The instructions are fetched in a 32-bit cycle into the location pointed to by the Local Write Program Counter (LWPC) 532. The LWPC 532 is contained in a register located in the P Unit 108. The P Unit 108 also includes the Local Read Program Counter (LRPC) 536 register, and the Write Program Counter (WPC) 530 and Read Program Counter (RPC) 534 registers. LRPC 536 points to the location in the IBQ 502 of the next instruction or instructions to be loaded into the instruction decoder/s 512 and 514. That is to say, the LRPC 534 points to the location in the IBQ 502 of the instruction currently being dispatched to the decoders 512, 514. The WPC points to the address in program memory of the start of the next 4 bytes of instruction code for the pipeline. For each fetch into the IBQ, the next 4 bytes from the program memory are fetched regardless of instruction boundaries. The RPC 534 points to the address in program memory of the instruction currently being dispatched to the decoder/s 512/514.

In this embodiment, the instructions are formed into a 48 bit word and are loaded into the instruction decoders 512, 514 over a 48 bit bus 516 via multiplexers 520 and 521. It will be apparent to a person of ordinary skill in the art that the instructions may be formed into words comprising other than 48-bits, and that the present invention is not to be limited to the specific embodiment described above.

For presently preferred 48-bit word size, bus 516 can load a maximum of 2 instructions, one per decoder, during any one instruction cycle for parallel execution. The combination of instructions may be in any combination of formats, 8, 16, 24, 32, 40 and 48 bits, which will fit across the 48-bit bus. Decoder 1, 512, is loaded in preference to decoder 2, 514, if only one instruction can be loaded during a cycle. The respective instructions are then forwarded on to the respective function units in order to execute them and to access the data for which the instruction or operation is to be performed. Prior to being passed to the instruction decoders, the instructions are aligned on byte boundaries. The alignment is done based on the format derived for the previous instruction during decode thereof The multiplexing associated with the alignment of instructions with byte boundaries is performed in multiplexors 520 and 521.

Still referring to FIG. 8, according to an aspect of the present invention, for deep instruction buffers the cost of mark and chain tags associated with each buffer location can be avoided by implementing a single pair of tag registers 801/802 to store the location in the instruction buffer of the first tag of each kind. The contents of each register is compared to local read program counter 536 by comparators 803/804. Breakpoint state machine 805 operates similarly to breakpoint state machine 106c and advantageously asserts trigger signal 806 only when both the mark instruction and chain instruction have been sent to the decode stages and execution is certain. In this embodiment, chained breakpoints involved with branches local to the instruction buffer in which the instruction buffer is not flushed will still be correctly detected.

Figure 9:
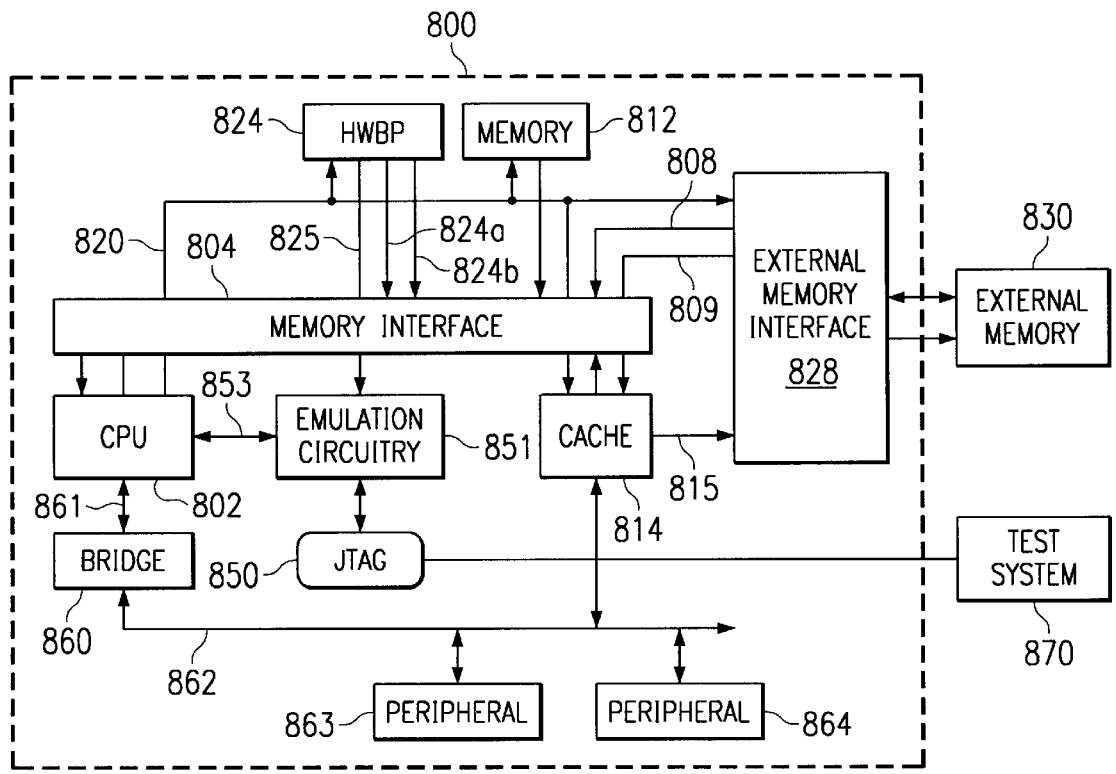
FIG. 9 is a block diagram illustrating another embodiment of the present invention.

FIG. 9 is a block diagram of an embodiment of the present invention. Hardware breakpoint event generator 824 monitors address bus 820 and asserts mark and chain signals 824a and 824b, as described above, when a corresponding instruction address is provided to memory interface 828 and cache memory 814. Mark and chain tags are implemented in memory interface 804 and passed to CPU 802 in conjunction with corresponding instructions. Emulation circuitry 851 contains a breakpoint state machine that monitors mark and chain tag signals 853 from an instruction pipeline stage within CPU 802 which is a point of no return pipeline stage for instructions sequencing through the execution pipeline. Upon detecting a chain tag for an instruction that is guaranteed to execute, emulation circuitry 851 sends a chained breakpoint event notification to an external test system 870 via JTAG interface 850.

JTAG interface 850 is an improvement on the structure of the IEEE 1149.1-1990 "Standard Test Access Port and Boundary Scan Architecture. Terms and concepts relating to IEEE 1149.1 which are used herein are explained fully in this IEEE standard.

The IEEE 1149.1 standard provides a communication protocol that allows the selection of one or more devices imbedded within a system. This protocol implements the primitives necessary to control on-chip debug and test facilities. JTAG Debug interface 850 adds two additional terminals (nET1 and nET0) to the five terminal version of the standard IEEE interface (nTRST, TCK, TMS, TDI, and TDO). Including nTRST in the debug interface definition simplifies system design as this terminal, when held LOW, generates an asynchronous reset to the test and debug logic of each device within the system. This guarantees normal system operation. This also eliminates the need for the system to provide a continuously running TCK. A detailed description of debug 850 can be found in U.S. Pat. No. 5,828,824 issued to Gary Swobads, and incorporated herein by reference.

An external test host system 870, such as an XDS-510 emulation system (available from Texas Instruments, Inc) can be connected to 7 pin JTAG interface 850 for controlling emulation control 851.

Still referring to FIG. 9, bridge 860 connects to data bus 861 and provides a buffered data bus, RBus 862. Peripherals 863 and 864 are representative of a variety of peripheral devices that may be connected to Rbus 862. Rbus 862 also connects to emulation circuitry 851 and to cache circuitry 814 in order to provide memory mapped access to registers therein.

Figure 10:
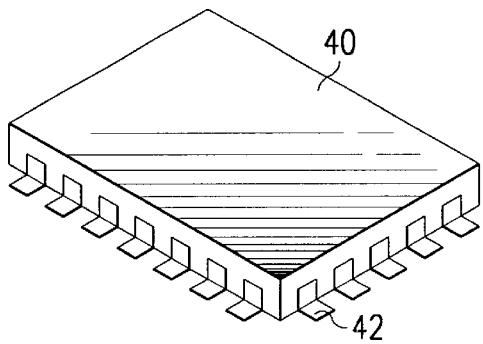
FIG. 10 is a schematic representation of an integrated circuit incorporating the processor.

FIG. 10 is a schematic representation of an integrated circuit incorporating digital system 10. As shown, the integrated circuit includes a plurality of contacts for surface mounting. However, the integrated circuit could include other configurations, for example a plurality of pins on a lower surface of the circuit for mounting in a zero insertion force socket, or indeed any other suitable configuration.

Figure 11:
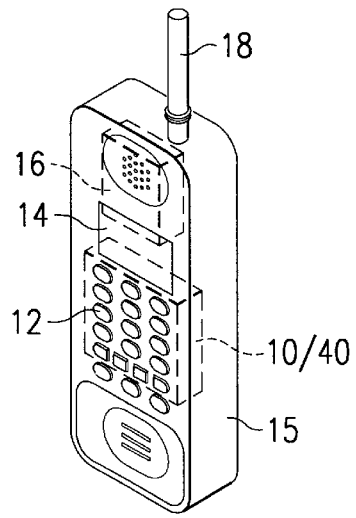
FIG. 11 is a schematic representation of a telecommunications device incorporating the processor of FIG. 1.

FIG. 11 illustrates an exemplary implementation of an example of such an integrated circuit in a mobile telecommunications device, such as a mobile telephone with integrated keyboard 12 and display 14. As shown in FIG. 11, the digital system 10 with processor 100 is connected to the keyboard 12, where appropriate via a keyboard adapter (not shown), to the display 14, where appropriate via a display adapter (not shown) and to radio frequency (RF) circuitry 16. The RF circuitry 16 is connected to an aerial 18.

Fabrication of data processing device 100 involves multiple steps of implanting various amounts of impurities into a semiconductor substrate and diffusing the impurities to selected depths within the substrate to form transistor devices. Masks are formed to control the placement of the impurities. Multiple layers of conductive material and insulative material are deposited and etched to interconnect the various devices. These steps are performed in a clean room environment.

A significant portion of the cost of producing the data processing device involves testing. While in wafer form, individual devices are biased to an operational state and probe tested for basic operational functionality. The wafer is then separated into individual dice which may be sold as bare die or packaged. After packaging, finished parts are biased into an operational state and tested for operational functionality.

An alternative embodiment of the novel aspects of the present invention may include other circuitries which are combined with the circuitries disclosed herein in order to reduce the total gate count of the combined functions. Since those skilled in the art are aware of techniques for gate minimization, the details of such an embodiment will not be described herein.

Thus, there has been described a processor that is a programmable digital signal processor (DSP), offering both high code density and easy programming. Architecture and instruction set are optimized for low power consumption and high efficiency execution of DSP algorithms, such as for wireless telephones, as well as pure control tasks such as controlling a hard disk drive. The processor includes an instruction buffer unit, and a data computation unit for executing the instructions decoded by the instruction buffer unit. Furthermore, the microprocessor has a means for detecting instructions designated as mark and chain and storing related tags in the instruction buffer. A breakpoint state machine monitors the tags when each instruction reaches a point of no return stage in the instruction execution pipeline and signals a chained breakpoint event only when the designated instructions are executed in the designated order.

Advantageously, a chained breakpoint event is not triggered by an instruction that is prefetched but later not executed.

In another embodiment, mark and/or chain tags can be generated in response to reading or writing of designated data locations.

In another embodiment, only a single tag is provided for each prefetched instruction and only single breakpoints are detected; however, according to aspects of the present invention the single breakpoint is correctly detected and does not trigger a breakpoint of the single breakpoint instruction is flushed before being executed.

In another embodiment, three tags are provided for each prefetched instruction, so that a chained breakpoint having three links is provided. In this case, a first instruction is designated as a mark1 instruction, a second instruction is designated as a mark2 instruction, and a third instruction is designated as a chain instruction. A breakpoint state machine monitors all three tag signals and triggers a breakpoint only when all three instructions are received in a point of no return stage in an instruction pipeline in the designated order. Similarly, another embodiment provides more than three tags for each prefetched instruction, so that a chained breakpoint having more than three links is provided As used herein, the terms "applied," "connected," and "connection" mean electrically connected, including where additional elements may be in the electrical connection path.

While the invention has been described with reference to illustrative embodiments, this description is not intended to be construed in a limiting sense. Various other embodiments of the invention will be apparent to persons skilled in the art upon reference to this description. It is therefore contemplated that the appended claims will cover any such modifications of the embodiments as fall within the true scope and spirit of the invention.

What is claimed is:

1. A digital system comprising a microprocessor, wherein the microprocessor is operable to execute a sequence of instructions obtained from an instruction bus, wherein the microprocessor comprises:

program counter circuitry for providing a first instruction address to the instruction bus;

an instruction buffer operable to hold at least a first instruction of the sequence of instructions obtained from the instruction bus;

breakpoint event generation circuitry connected to the instruction bus operable to detect a designated breakpoint instruction in the sequence of instructions;

tag circuitry associated with the instruction buffer operable to hold a breakpoint tag, further operable to be set in response to the breakpoint event circuitry;

an instruction execution pipeline connected to receive the sequence of instructions from the instruction buffer along with respective breakpoint tags from the tag circuitry, the instruction execution pipeline having a point of no return instruction pipeline stage; and breakpoint state machine circuitry connected to the point of no return instruction pipeline stage, operable to monitor breakpoint tags received by the point of no return instruction pipeline stage, further operable to indicate a breakpoint event when a breakpoint tag is received.

2. The digital system according to claim 1, wherein:

the breakpoint event generation circuitry is operable to detect a designated mark breakpoint instruction and a designated chain breakpoint instruction in the sequence of instructions;

the tag circuitry is operable to hold a mark tag and a chain tag; and the breakpoint state machine circuitry is operable to monitor the mark tag and the chain tag received by the point of no return instruction pipeline stage, the breakpoint state machine circuitry is further operable to indicate a chained breakpoint event only when a chain tag is received after a mark tag.

3. The digital system of claim 2, wherein the tag circuitry is operable to hold a plurality of mark tags and wherein the breakpoint state machine is operable to indicate a chained breakpoint event only when a chain tag is received after a designated plurality of mark tags.

4. The digital system of claim 3, wherein the breakpoint state machine is operable to indicate a chained breakpoint event only when the designated plurality of mark tags are received in a designated order.

5. The digital system according to claim 1, wherein the instruction buffer comprises a plurality of registers for holding a plurality of instructions of the sequence of instructions; and wherein the tag circuitry comprises a first tag register operable to hold a location in the instruction buffer of the first mark tag and a second tag register operable to hold a location in the instruction buffer of the first chain tag.

6. The digital system according to claim 1, further comprising an additional breakpoint event generation circuit connected to a data bus.

7. The digital system according to claim 1 being a cellular telephone, further comprising:

an integrated keyboard connected to the processor via a keyboard adapter;

a display, connected to the processor via a display adapter;

radio frequency (RF) circuitry connected to the processor; and an aerial connected to the RF circuitry.

8. A method of operating a digital system comprising a microprocessor, wherein the microprocessor is operable to execute a sequence of instructions, comprising the steps of:

generating a mark event or a chain event when instructions in the sequence of instructions are prefetched into an instruction buffer;

storing the mark event or chain event as a tag in the instruction buffer with an associated prefetched instruction;

transferring each prefetched instruction in the sequence of instructions from the instruction buffer to an instruction execution pipeline connected to receive the prefetched instructions from the instruction buffer along with respective mark tags and chain tags, wherein the instruction execution pipeline has a point of no return instruction pipeline stage; and monitoring mark tags and chain tags received by the point of no return instruction pipeline stage and indicating a chained breakpoint event when a chain tag is received after a mark tag.

* * * * *